H. W. Safford,
Well Reamer.
Nº 60,261.          Patented Dec. 4, 1866.
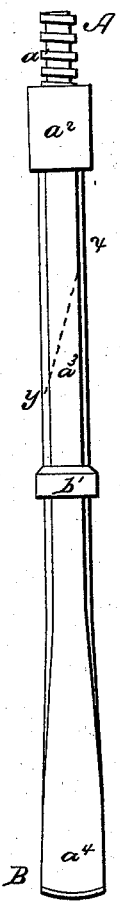
Witnesses;
Inventor;
Henry C Safford

United States Patent Office.

IMPROVEMENT IN DRILLS FOR WELLS.

HENRY W. SAFFORD, OF PHILADELPHIA, PENNSYLVANIA.

Letters Patent No. 60,261, dated December 4, 1866.

SPECIFICATION.

TO ALL WHOM IT MAY CONCERN:

Be it known that I, HENRY W. SAFFORD, of the city of Philadelphia, in the State of Pennsylvania, have invented a new and useful Improvement in the Drill or Reamer used in boring deep Wells; and I do hereby declare that the following is a full, clear, and exact description of the construction and operation of the same, reference being had to the accompanying drawing, making a part of this specification, and to the letters of reference marked thereon.

In the operation of boring petroleum and other deep wells, it frequently happens that the shank or stem of the drill, centre-bit, or reamer used for the purpose, breaks across or parts at the usual weld, just below the screw and boss whereby it is fastened to the lower end of the operating-shaft, and consequently it often becomes impossible to withdraw from the well the lower or cutting end of the said tool without weeks of labor and a heavy expenditure of money; and in many cases of petroleum wells nearly finished, the well has to be wholly abandoned, at a loss of thousands of dollars, in consequence of the broken tool therein, and a new well commenced.

The object of my invention is to provide against this very serious difficulty in boring petroleum and other deep wells; and it consists in providing the said drill, or other tool used for the purpose, with a supplementary boss or projecting shoulder, welded or otherwise fixed around on the shank or stem of the said tool, at any suitable point below the said weld, so that if, in boring or drilling at any depth, the weld part, or the shank or stem, break above the said supplementary boss, there will not be any difficulty in withdrawing the lower or cutting end of the said tool, as the said supplementary boss thereon will afford an appropriate head beneath which the usual grappling-irons will close on the shank, and thus enable the operator to withdraw the broken-off end of the tool with the greatest facility and certainty.

In the drawing, A B represents a common drill used in boring petroleum wells; $a^1$ being the screw, and $a^2$ the boss or shoulder which abuts against the lower end of the usual operating-rod, (not shown in the drawing,) to which the tool must be screwed fast; $a^3$ is called the shank or stem; the lower or cutting end, $a^4$, of the tool being usually welded to the upper end at the point marked by the dotted diagonal line $x\,y$; and $b^1$ is the supplementary boss or shoulder. The supplementary boss $b^1$ is simply an iron band welded around on the shank $a^3$, so as to produce a surrounding offset or shoulder at a sufficient distance below the welding-line $x\,y$, not to interfere with the welding operation which a break may, at any time, require to be performed. In boring deep wells, the tools always break at or near the weld $x\,y$, the weld sometimes parting, and it will be seen that, in either case, the supplementary boss $b^1$ will enable the operator to withdraw the cutting end of a broken tool from the well, immediately, and without any difficulty, by the use of the usual grappling-irons. The thing is very simple, but nevertheless new and important in its application for this purpose. Old drillers say it will save thousands of dollars in boring deep wells; and my own experience in the art satisfies me that it will hereafter be considered absolutely indispensable, on the ground of economy.

Having thus fully described m improvement, what I claim as new of my invention, and desire to secure by Letters Patent, is—

Providing the stem or shank, $a^3$, of the drill A B, or other boring or cutting tool used in making deep wells, with a fixed projecting shoulder or supplementary boss, $b^1$, between the upper boss $a^2$ and the cutting end $a^4$, substantially as and for the purpose described.

HENRY W. SAFFORD.

Witnesses:
BENJ. MORISON,
JAS. WINSMORE, Jr.